Oct. 15, 1963   N. ABRAMSON   3,106,995
BOLTED OPEN-WEB STRUCTURAL ASSEMBLIES
Filed Dec. 19, 1961   2 Sheets-Sheet 1
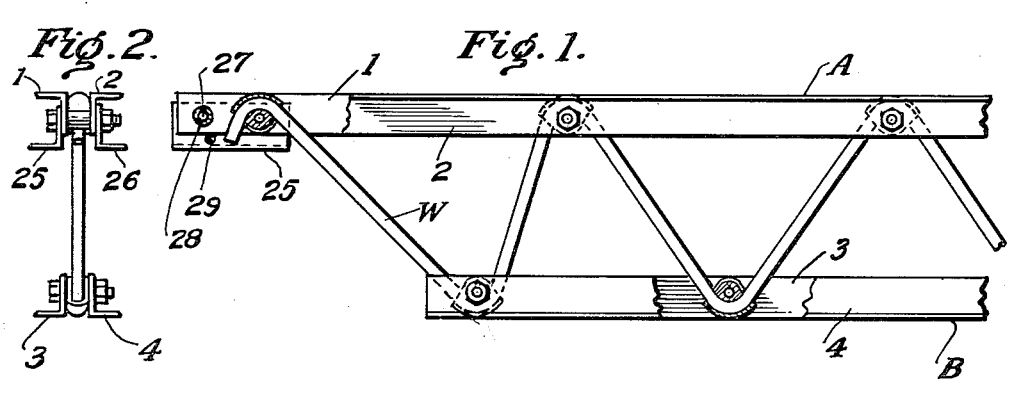
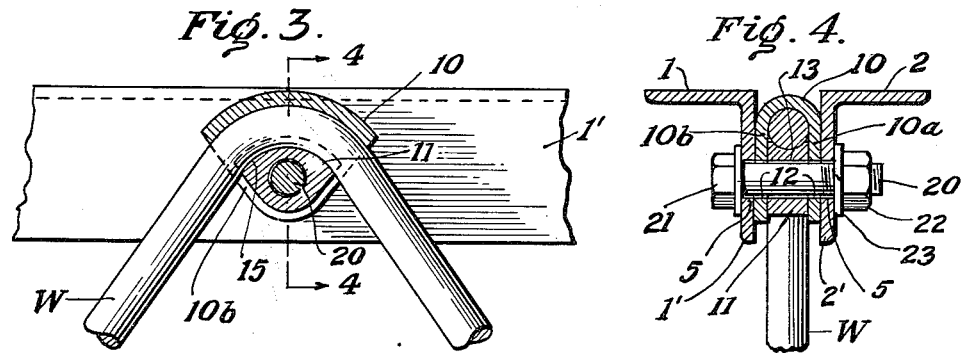
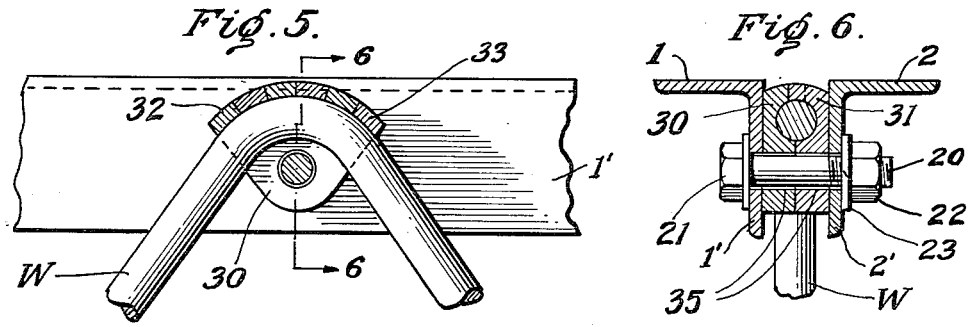
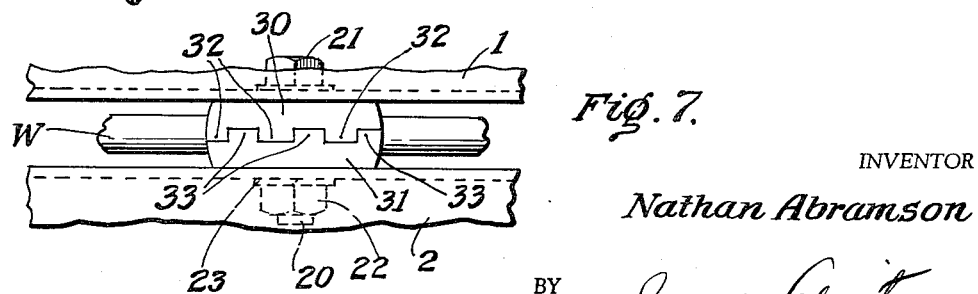
INVENTOR
*Nathan Abramson*
BY
*Samuel Klonsky*
ATTORNEY United States Patent Office 3,106,995
Patented Oct. 15, 1963

3,106,995
BOLTED OPEN-WEB STRUCTURAL ASSEMBLIES
Nathan Abramson, 8005 Park Crest Drive,
Silver Spring, Md.
Filed Dec. 19, 1961, Ser. No. 161,774
9 Claims. (Cl. 189—37)

This invention relates to open-web structure members and in particular to structural joists having bars as web members.

It is the object of the present invention to produce structural members of the type exemplified by open-web joists of the character of a Warren truss, consisting of an upper chord and a lower chord and web members extending therebetween formed by bending a continuous bar in zigzag fashion to form a series of triangles, the apexes of which are secured to the chords at panel points by bolts, lock washers and nuts, or locknuts, or by high strength bolts, hardened washers and nuts, rather than by welded joints as has been practiced in the art heretofore.

It is another object of the invention to fabricate metallic joists with no welding procedures, with consequent manufacturing economies. Economical structural units are attained by virtue of the elimination of high priced welding labor, welding equipment and material, as well as the costly inspection of welded joints. Furthermore, the joists in accordance with the invention are characterized by low residual stress, absence of warpage and joints which are free of any thermal stresses inherent in welded connections.

It is another object of the invention to make possible the production of rugged and reliable structural units in situ, since these may be assembled in the shop or at the job with the use of unskilled labor, requiring only wrenches in the assembling operation.

It is another object of the invention to provide reliable joints between the chords of the joists and the metal rod forming the web, which will withstand dynamic loads and shock without failure, and which will provide a connection between the parts which is positive and not subject to fracture under impact, as is sometimes the case with a welded connection.

The invention proceeds upon the principle of providing an upper chord formed generally by a pair of spaced structural members which may be conventional angles or this chord may be a single member having spaced depending legs. A lower chord of similar structural members or member is provided below the upper chord. An open-web member in the form of a continuous bar or rod extends in zigzag fashion between the upper and lower chords, and special junction means are provided to interconnect the bar with the structural members at each turn of the former as the same extends in zigzag fashion between the upper and lower chord members.

The zigzag web member is interconnected with the depending legs of the chord members by means of bolts passing through openings in the legs and the special clamping means. By this arrangement, the tensile and compressive stresses are transmitted smoothly to the chord members without undue strain or fatigue at any part thereof. The interconnecting means for the truss are the same for both the upper and lower chords so that the assembly may be effected quickly and economically, without a multiplicity of parts of different design.

In some instances it is desirable that the open-web member be constituted by a plurality of continuous bars or rods arranged side by side. When the span of a joist is short and the superimposed load is great enough, the critical stress is the shear which is taken primarily by the web. In other words, the shear governs. Hence, a larger web member is needed yet the chord members can be small. Therefore, if a single large diameter bar is used for the web, then the vertical legs of the chord angles must be longer than necessary in order to accommodate the larger clamping segments. This results in a waste of chord material. By using two smaller bars for the web, with a combined cross-sectional area the same as the large bar, small chord angles can still be used to attain a balanced structural unit, which is designed for maximum stresses for the available material.

For a long span the stress in the chords governs, yet it may be desirable to keep web bar sizes to a minimum. By using two smaller bars with the same cross-sectional area as the large one, the sizes of bars and clamping segments are held to only a few. The joist will actually have greater stability as the radius of gyration of the chords will be greater, because of the bigger spread, giving added strength to the upper or compression chord.

Other objects and purposes will appear from the detailed description of the invention following hereinafter, taken in conjunction with the accompanying drawings, wherein FIG. 1 is a front elevation with parts broken away in section to illustrate details of the open-web structural joist in accordance with the present invention;

FIG. 2 is a left end view of FIG. 1;

FIG. 3 is an enlarged view of one of the junction points between the upper chord and the web member at the medial section thereof;

FIG. 4 is a vertical sectional view along line 4—4 of FIG. 3;

FIG. 5 is a view corresponding to FIG. 3, illustrating a second embodiment of interconnecting means between the angle members of the upper chord and the bar forming the open web;

FIG. 6 is a vertical sectional view along line 6—6 of FIG. 5;

FIG. 7 is a partial plan view of the joist illustrated in FIGS. 5 and 6;

Figure 8:
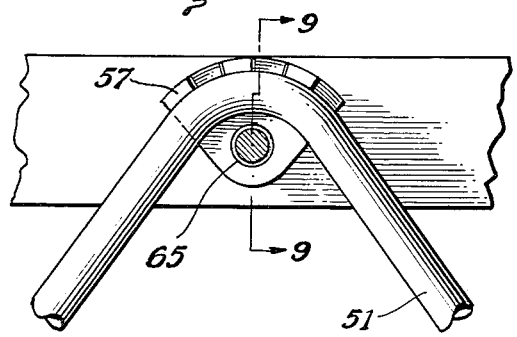
FIG. 8 is a view corresponding to FIGS. 3 and 5, illustrating still another embodiment of the invention utilizing multiple bars for the web member.

In the drawing is shown an open-web joist which may be formed of steel, aluminum or other metal, plastic or any other suitable structural material. The joist is formed of an upper chord A consisting of a pair of spaced structural angles 1 and 2 and a lower chord B, likewise formed of a pair of spaced structural angles 3 and 4. The chords may be formed of different structural members such as angles, channels, or even integral units as long as spaced legs constitute parts thereof. Such are provided by legs 1' and 2' extending downwardly from angles 1 and 2 as shown in FIGS. 3 to 6. As is common in open-web joists, a bar W extends in zigzag fashion between the upper and lower chords A and B, but in contradistinction to conventional practice, the bar of the web is connected to the upper and lower chords by means of special junction devices, including bolts and nuts, rather than by welded joints. Such a construction is particularly advantageous when dealing with metals or members which are difficult to weld or which suffer loss of strength through the welding process.

In order to fix the web members rigidly to the upper and lower chords in a manner that they may withstand and transmit the tensional and compressive forces acting at the panel points, special junction devices are provided for this purpose. As shown in FIGS. 1 to 4, this junction device consists of a bipartite U-shaped clamp 10 having the opposite faces or plates thereof 10a and 10b in the form of a pair of congruous radial sections. Aligned openings 12 are provided at the restricted ends of the opposite plates for the reception of a bolt therethrough. A shackle or saddle 11, of a thickness corresponding to the spacing between the plates, is likewise provided with a longitudinal bore 13 for the reception of the bolt 20. The extended arcuate edge 15 of the saddle is shaped to fit the contour of the bar W and is shown of dished or concave cross-section in FIG. 4. The arcuate edge of the saddle, of convex outline as shown in FIG. 3, complements the concave outline on the inner face of the U-clamp to embrace tightly the periphery of the bar substantially in its entirety. The several components of the chord, web and junction means are integrated by means of the bolt 20, provided with a head 21, which bolt is passed through aligned openings 5 in the pair of angle members 1 and 2 of the chord A, openings 12 of the clamp 10 and opening 13 of the saddle 11, and bound together tightly by means of the nut 22 and the lock washer 23. Lock nuts may be used with standard bolts, in lieu of lock washers; or the connection may be made with high strength bolts, hardened washers and nuts. In the latter case a predetermined high tension is induced in the bolt, thereby transmitting all stresses at the joint by friction and eliminating shearing action on the bolt.

The U-clamp 10 grips the web bar at the panel point and the saddle gives adequate bearing contact at the inner bend of the bar making a tight connection.

Identical U-clamps and saddles 11 are used for the upper and lower chords at all panel points, thereby necessitating only two different parts in addition to the bolts, nuts and lock washers, to effect the assembly of the open-web truss.

As shown in FIGS. 1 and 2, the upper chord may be provided with clip angles 25 and 26 bolted to the angles 1 and 2, respectively, to form a seat or bearing for the joist at the wall or beam support. The outer bolt 27 is provided with a spacer sleeve 28 between the chord angles to permit the tightening of the bolt. One or more holes 29 may be punched or drilled in the clip angles 25 and 26 for insertion of a wall anchor, beam clamp or bolt for beam connection.

In the embodiment shown in FIGS. 5 to 7, the junction means between the vertical legs of the angles forming the chords are disposed laterally of each other rather than above and below each other to embrace tightly the bar of the web at each change of direction thereof. Clamping segments 30 and 31 are each provided with an arcuate recess therein corresponding to the curvature of the bend in the zigzag bar, and of a cross-section to accommodate one-half the cross-section of the bar.

Circular openings 35 extend through the thickness of the arcuate locking plates or segments 30 and 31 adjacent their restricted ends for the reception of the bolt 20 therethrough. A plurality of toothed projections or serrations 32 are provided on the inner lateral wall adjacent to the enlarged end of member 30 and similar projections 33 are provided on the inner lateral wall of member 31 which are designed to interengage in respective openings formed between the toothed projections. Actually, members 30 and 31 are of identical construction so that they may be fabricated economically and mate together when they are disposed in opposing relation, as shown in FIGS. 5 to 7. The toothed serrations or projections 32 and 33 in the meeting edges of the clamping plates 30 and 31 prevent slippage under stress.

Aside from the fact that the intermembering units 30 and 31 are identical and may be fabricated in a common die, the arcuate opening in each may be so formed that they embrace fully the entire periphery of the bar.

While the web W is illustrated in the drawing as being formed of cylindrical section, the bar may be formed of any other desired cross-section which would entail a modification of the arcuate surfaces or openings in the clamping members to conform thereto.

Since the fabrication of the structural joists is executed exclusively with bolt and nut fasteners and with no welding whatever, the same may be used with special advantages when metals or members difficult to weld are being handled.

In FIGS. 8 to 11 is illustrated another embodiment of the invention which is adapted to meet special design needs. The structural joists in accordance with the invention are capable of modification, depending upon the characteristics of the stresses encountered in different building designs.

In the case of joists of short spans, with sufficiently great superimposed loads, the critical stress is in shear which is taken up primarily by the web. If a web member of larger cross-section is used, this requires chord members of greater depth which therefore fails to use the material in the truss most efficiently. To cope with this problem, resort may be had to an arrangement such as shown in FIGS. 8 to 11, wherein a web member of multiple bars disposed side by side are clamped between the juxtaposed legs of the chord members. Thus, the angles 41 and 42 are provided with vertical legs 41' and 42', respectively, along which are disposed openings for the fastening bolts as in the embodiments described above. Use is made of an intermediate spacer segment 45 between end clamping segments 43 and 44 adjacent the vertical walls 41' and 42', respectively. The latter are provided with toothed projections 47 which alternate with recesses 48. The elements 43 and 44 are identical and interengage with each other when in opposed relation in the manner described above in connection with the embodiment shown in FIGS. 5 and 6.

The intermediate spacer segment 45 is provided with toothed projections 57 extending from the opposite sides of the peripheral wall of the segment, which alternate with recesses 58. The projections 57 are accommodated within the recesses 48 in the end clamping segments, and the recesses 58 in the intermediate spacer accommodate the toothed projections 47 of the end segments 43 and 44.

Figure 11:
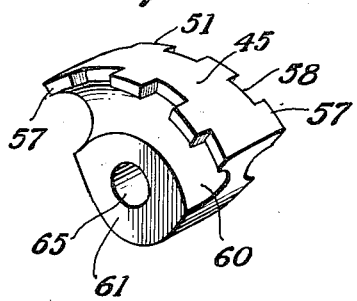
FIG. 11 is a perspective view of the intermediate spacer segment shown in FIGS. 9 and 10.

As shown in FIG. 11, the lateral face of the intermediate spacer is provided with an arcuate recess 60 for receiving half of the bar W therein, the other half of which is accommodated in the arcuate recess of the adjacent end clamp. The central portion of each face of the intermediate spacer segment is plane for close juxtaposition to the corresponding inwardly facing planes of the end segments 43 and 44.

As shown in FIGS. 8 to 11, not only are the end clamps interchangeable with each other, but the intermediate spacer segment is reversible so that the same may be faced interchangeably for cooperation with the end clamps 43 and 44.

The headed bolt 62 is adapted to pass through the openings in the vertical legs 41' and 42', and the cylindrical openings in the end clamps as well as the opening 65 in the spacer segment for clamping the several components together by means of the nut 66, with the interposition of lock washers, if such are desired.

Figure 9:
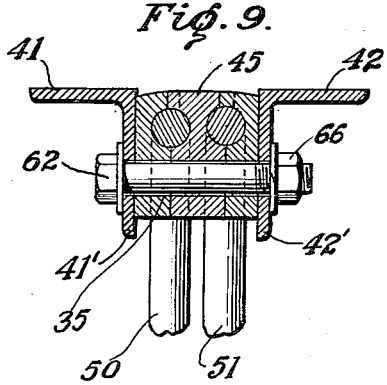
FIG. 9 is a vertical sectional view along line 9—9 of FIG. 8.
Figure 10:
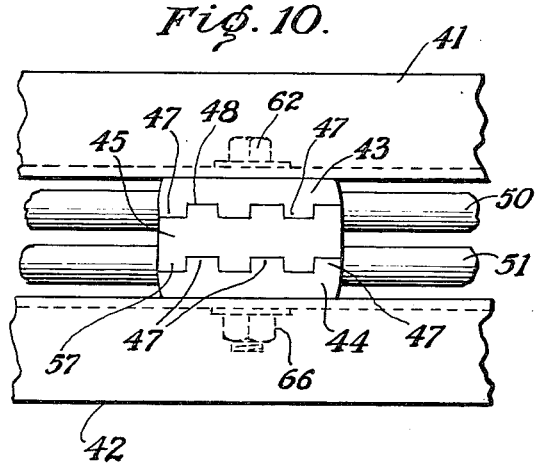
FIG. 10 is a partial plan view of the joist shown in FIGS. 8 and 9.

While FIGS. 9 and 10 show a web member formed of two juxtaposed bars 50 and 51, the number of such bars may be varied, depending upon the desired cross-section of metal in the web. In such cases any number of intermediate spacers may be used. Such an arrangement permits the obtention of joists for varying loadings, while reducing the number of sizes of the clamping segments and bars. Furthermore, the end clamping members are reversible with each other, and the intermediate member is likewise reversible with respect to the end clamps, so that the assembly of the joists may be executed rapidly, without need for skilled labor.

The structural angles or members forming the upper or lower chords may be designed with the openings 5 therein at any desired spacing to fabricate structural joists having any desired loading characteristics. The relative spacing of the openings in the upper and lower chords controls the angularity between the adjacent web members. This expedient affords a high degree of flexibility in structural design.

This application is a continuation-in-part of my application Serial No. 779,687, filed December 11, 1958 now abandoned.

While I have described my invention as embodied in specific forms and as operating in specific manners for purpose of illustration, it should be understood that I do not limit my invention thereto, since various modifications will suggest themselves to those skilled in the art without departing from the spirit of my invention, the scope of which is set forth in the annexed claims.

I claim:

1. An open-web bolted structural joist comprising an upper chord having a pair of spaced legs provided with aligned openings at spaced points therealong, a lower chord having a second pair of spaced legs also provided with aligned openings therealong, web members in the form of a continuous bar extending in zigzag relation in the spaces between the respective legs of said chords, the straight portions of the bar being integral with and tangent to a curved sector at each change in direction of said bar, bipartite clamping means including a separable junction device embracing substantially the entire exterior surface of said bar at each curved sector, said junction device having an opening therein coaxial with a pair of aligned openings in said chords, and a bolt extending through said aligned openings and capped with a nut at its free end for rigidly clamping said web members to said chords.

2. An open-web bolted structural joist comprising an upper chord formed by a pair of spaced structural members provided with aligned openings at spaced points therealong, a lower chord formed by a second pair of spaced structural members also provided with aligned openings therealong, web members in the form of a continuous bar extending in zigzag relation in the spaces between the respective structural members, the straight portions of the bar being integral with and tangent to a curved sector at each change in direction of said bar, means including bolts and nuts interconnecting said web members with said structural members comprising a separable junction means embracing substantially the entire exterior surface of said bar at said curved sectors between said structural members, with each bolt extending through said last-mentioned means and a pair of said aligned openings in the structural members adjacent thereto.

3. A structural joist as set forth in claim 2 wherein said separable junction means comprises a U-shaped clamp composed of a pair of spaced congruous radial sector plates joined by an arcuate wall extending between the enlarged parts of said plates, said wall conforming to the outer bend of said bar and the cross-sectional periphery thereof and said plates provided with aligned openings at the restricted ends thereof, and a saddle between said plates having a bore in alignment with said last-mentioned openings and provided with a curved edge conforming to the inner bend of said bar and to the cross-sectional periphery thereof.

4. An open-web bolted structural joist comprising an upper chord formed by a pair of spaced structural members provided with aligned openings at spaced points therealong, a lower chord formed by a second pair of spaced structural members also provided with aligned openings therealong, web members in the form of a continuous bar extending in zigzag relation in the spaces between the respective structural members, means including bolts and nuts interconnecting said web members with said structural members comprising a separable junction means embracing a substantial radial sector of said continuous bar at each change of direction in the space between said structural members, said separable junction means including a pair of opposed clamping plates having aligned openings at one portion thereof in alignment with the openings in the spaced structural members for the passage of a fastening bolt therethrough, inwardly facing teeth on each of said clamping plates in interengagement with each other, and an arcuate recess conforming to half the cross-section of the web bar and to the change of direction thereof on the inner face of each clamping plate between the bolt opening and the teeth therein.

5. A device as set forth in claim 4 wherein said clamping plates are shaped as sectors with the bolt opening adjacent to the apex thereof and the radial teeth adjacent to the periphery thereof.

6. An open-web bolted structural joist comprising an upper chord provided with openings at spaced points therealong, a lower chord also provided with openings therealong, web members in the form of a continuous bar extending in zigzag relation between said chords, the straight portions of the bar being integral with and tangent to a curved sector at each change in direction of said bar, clamping means including separable members embracing substantially the entire exterior surface of said bar at said curved sectors, each clamping means being provided with an opening in alignment with one of the openings in said chords, and fastening means extending through said aligned openings for rigidly clamping said web members to said chords.

7. A device as set forth in claim 6 wherein said last-mentioned fastening means consists of bolt and nut assemblies.

8. An open-web bolted structural joist comprising an upper chord formed by a pair of spaced structural members provided with aligned openings at spaced points therealong, a lower chord formed by a second pair of spaced structural members also provided with aligned openings therealong, web members in the form of a plurality of juxtaposedly spaced continuous bars extending in zigzag relation in the spaces between the respective structural members, means including bolts and nuts interconnecting said web members with said structural members comprising a separable junction means embracing a substantial radial sector of each continuous bar at each change of direction in the space between said structural members, said separable junction means including a pair of opposed end clamping plates having aligned openings at one portion thereof in alignment with the openings in the spaced structural members for the passage of a fastening bolt therethrough, inwardly facing teeth alternating with recesses on each of said end clamping plates, at least one intermediate clamping plate provided with outwardly facing recesses alternating with teeth which interengage respectively with the teeth and recesses on said end clamping plates, and an arcuate recess conforming to half the cross-section of the web bars and to the change of direction thereof on the inner face of each end clamping plate and on each face of said intermediate clamping plate, between the bolt openings and the teeth therein.

9. A structural joist as set forth in claim 1, wherein the openings in the legs of the lower chord are displaced relatively to the openings in the legs of the upper chord so that the zigzag courses of the continuous bar of the web member are inclined to the vertical.

References Cited in the file of this patent

UNITED STATES PATENTS

| 555,015 | Mannesmann | Feb. 18, 1896 |
| 772,742 | Parent | Dec. 20, 1904 |
| 2,500,940 | Fisher | Mar. 21, 1950 |

FOREIGN PATENTS

| 51,064 | Switzerland | Jan. 29, 1911 |
| 725,801 | France | Feb. 16, 1932 |